United States Patent [19]
Iizuka

[11] Patent Number: 4,928,092
[45] Date of Patent: May 22, 1990

[54] PATTERN INPUT UNIT

[75] Inventor: Yoshio Iizuka, Tokyo, Japan

[73] Assignee: Kokoku Rubber Industry Company Limited, Tokyo, Japan

[21] Appl. No.: 114,216

[22] Filed: Oct. 28, 1987

[30] Foreign Application Priority Data

Oct. 30, 1986 [JP] Japan ............................. 61-257018

[51] Int. Cl.⁵ ............................................. G09G 1/16
[52] U.S. Cl. .................................... 340/707; 340/706
[58] Field of Search ............... 340/706, 707, 708, 747; 178/18, 19

[56] References Cited

U.S. PATENT DOCUMENTS

| | | | |
|---|---|---|---|
| 4,263,592 | 4/1981 | Takahashi et al. | 340/707 |
| 4,344,135 | 8/1982 | Crane et al. | 178/18 |
| 4,665,282 | 5/1987 | Sato et al. | 178/18 |
| 4,689,614 | 8/1987 | Strachan | 340/707 |
| 4,697,175 | 9/1987 | Macdonald | 340/707 |
| 4,745,241 | 5/1988 | Furukawa et al. | 178/18 |
| 4,752,655 | 6/1988 | Tajiri et al. | 178/18 |
| 4,785,564 | 11/1988 | Gurtler | 340/707 |

*Primary Examiner*—Gerald Brigance
*Attorney, Agent, or Firm*—Gifford, Groh, Sheridan, Sprinkle and Dolgorukov

[57] ABSTRACT

According to a pattern input unit of the invention, when a pattern is written by hand on an absolute coordinate data output means, a decision will be made on whether a segment or two points must be formed by a decision means according to two absolute coordinates generated one after another therefrom, point or segment is displayed in sequence on a display means according to the decision result, thus displaying a pattern same as the pattern written by hand.

1 Claim, 3 Drawing Sheets

PATTERN INPUT UNIT

BACKGROUND OF THE INVENTION

1. Field of the Invention

The present invention relates to a pattern input unit for inputting patterns on a pen touch as in the case of actual handwriting.

2. Description of the Prior Art

FIG. 4 exemplifies a prior art pattern input unit. In the drawing, 1 denotes a tablet as an absolute coordinate data output means, outputting an absolute coordinate data at a pen touch position. A reference numeral 2 denotes a pen touch detector for detecting whether or not a pen (not indicated) is touched to the tablet 1, and a level of an output signal generated therefrom comes on a low level (L) at all times, but when the pen is touched to the tablet 1, it becomes a high level (H). A reference numeral 3 denotes a coordinate converter for converting into a relative coordinate according to an absolute coordinate data generated from the tablet 1. A reference numeral 4 denotes a two-phase clock signal generator for generating a two-phase clock signal. A reference numeral 5 denotes a preset down counter (hereinafter abbreviated as "counter38 ), wherein a relative coordinate data from the coordinate converter 3 is preset, and the clock signal from the two-phase clock signal generator 4 is counted. When the count reads "0", an H single pulse is generated from an output terminal of the counter 5. A reference numeral 6 denotes a J-K flip-flop (J-K FF), wherein a terminal J is connected to a direct current supply through a resistance, a terminal K is connected to a ground, an output signal of the coordinate converter 3 is inputted to a terminal CK, an output signal from the counter 5 is inverted by an inverter 7 and then inputted to a terminal CLR. A reference numeral 8 denotes AND gate, wherein an output signal from the pen touch detector 2 and an output signal from the counter having the level inverted by the inverter 7 are subjected to AND operation, and the output signal is inputted to the coordinate converter 3. Reference numerals 9, 10, 11, 12 denote AND gates each, one two-phase clock signal is inputted to one input terminal of AND gates 9, 11, while the other two-phase clock signal is inputted to one input terminal of AND gates 10, 12, and a signal from a terminal Q of the FF 6 is inputted to the other input terminals of AND gates 9, 10, 11, 12. A reference numeral 13 denotes CPU, to which output signals of AND gates 9, 10, 11, 12 are inputted. A reference 14 denotes a switch with its contact piece connected to CPU 13, a ready access terminal "a" connected to the pen touch detector 2 and a ready access terminal "b" to a ground. A reference numeral 15 denotes a cathode ray tube (CRT), whereon a pattern is displayed by a cathode ray tube control (CRTC) 16 according to the clock signal inputted to CPU 13. A display means is constituted of CRT 15 and CRTC 16.

Next, a pattern input operation will be described with reference to the pattern shown in FIG. 2. (i) First, the pen (not indicated) is touched to an origin on the tablet 1.

Next, when the pen touched to the origin is detached from the tablet 1, an output signal level of the pen touch detector 2 shifts from H to L.

Then, when the pen is touched at a point A on the tablet 1, the output signal level of the pen touch detector 2 shifts from L to H, and an output signal level of AND gate 8, namely an input signal level inputted to the coordinate converter 3 shifts from L to H. Then, it is converted into a relative coordinate (equal to absolute coordinate in this case) of the point A to the origin by the coordinate converter 3 according to a coordinate data of the origin and an absolute coordinate data of the point A, and the relative coordinate is preset on the counter 5. Further, when the relative coordinate is preset on the counter 5, a counting of the clock signal from the two-phase clock signal generator 4 is commenced by the counter 5, and the clock signal from the two-phase clock signal generator 4 is inputted concurrently to CPU 13 by way of AND gates 9 to 12.

Then, when the count reads "0", or counting of the clock signal is over, an H single pulse is generated from the counter 5, and after having the level inverted by the inverter 7, the single pulse is inputted to the terminal CLR of FF 6 and one input terminal of AND gate 8. FF 6 is then cleared, and a level of the terminal Q of FF 6 becomes L. Further, an L single pulse is inputted to the coordinate converter 3 from output terminal of AND gate 8, and the coordinate converter 3 is returned to the state before converting operation.

After that, if the pen is shifted continuously in the direction of point B as touched to the tablet 1, a level of the output terminal of AND gate 8 remains H as the output signal level of the pen touch detector 2 is kept at H and the output terminal level of the counter 5 is also kept at H. Accordingly, a conversion from the absolute coordinate into the relative coordinate is carried out by the coordinate converter 3, the above-described operation is repeated, and a segment on CRT 15 elongates succesively after a move of the pen.

The pen is then stopped moving at the point B and detached from the tablet 1, and from transferring a contact piece of the switch 14 to the ready access terminal "b" from "a", an L signal is inputted to CPU 13, and a segment AB is formed on CRT 15 by CRTC 16 according to the clock signal inputted to CPU 13 by the time when the switch 14 is transferred. (ii) Forming a segment CD continuously The pen detached from the tablet 1 at the point B is then retouched at point C, and the contact piece of the switch 14 is transferred to the ready access terminal "a" from "b".

Then, from moving the pen toward a point D from the point C, the segment on CRT 15 gets long after a move of the pen as in the case essentially of (i) described above. The pen is then stopped moving at the point D and detached from the tablet 1, and from transferring the contact piece of the switch 14 to the ready access terminal "b" from "a" concurrently, a segment CD is formed on CRT 15. (iii) Forming points F, G, H continuously The case is similar essentially to the operation of the aforementioned (i), therefore a repeated description will be omitted here.

The prior art pattern input unit is constructed such that the switch 14 is transferred concurrently with detaching the pen from the tablet 1, the pen is retouched to the tablet 1 and then the switch 14 is transferred, accordingly when particularly complicate pattern is inputted, the switch 14 must be operated frequently to troublousness.

SUMMARY OF THE INVENTION

A construction of the pattern input unit according to the invention is such that whether a segment is formed or two points are formed is decided by a decision means according to two absolute coordinates generated from an absolute coordinate data output means, the point or the segment is displayed on a display means according to the decision result, thereby inputting patterns as in the case of actual handwriting.

DETAILED DESCRIPTION OF PREFERRED EMBODIMENT

Figure 1:
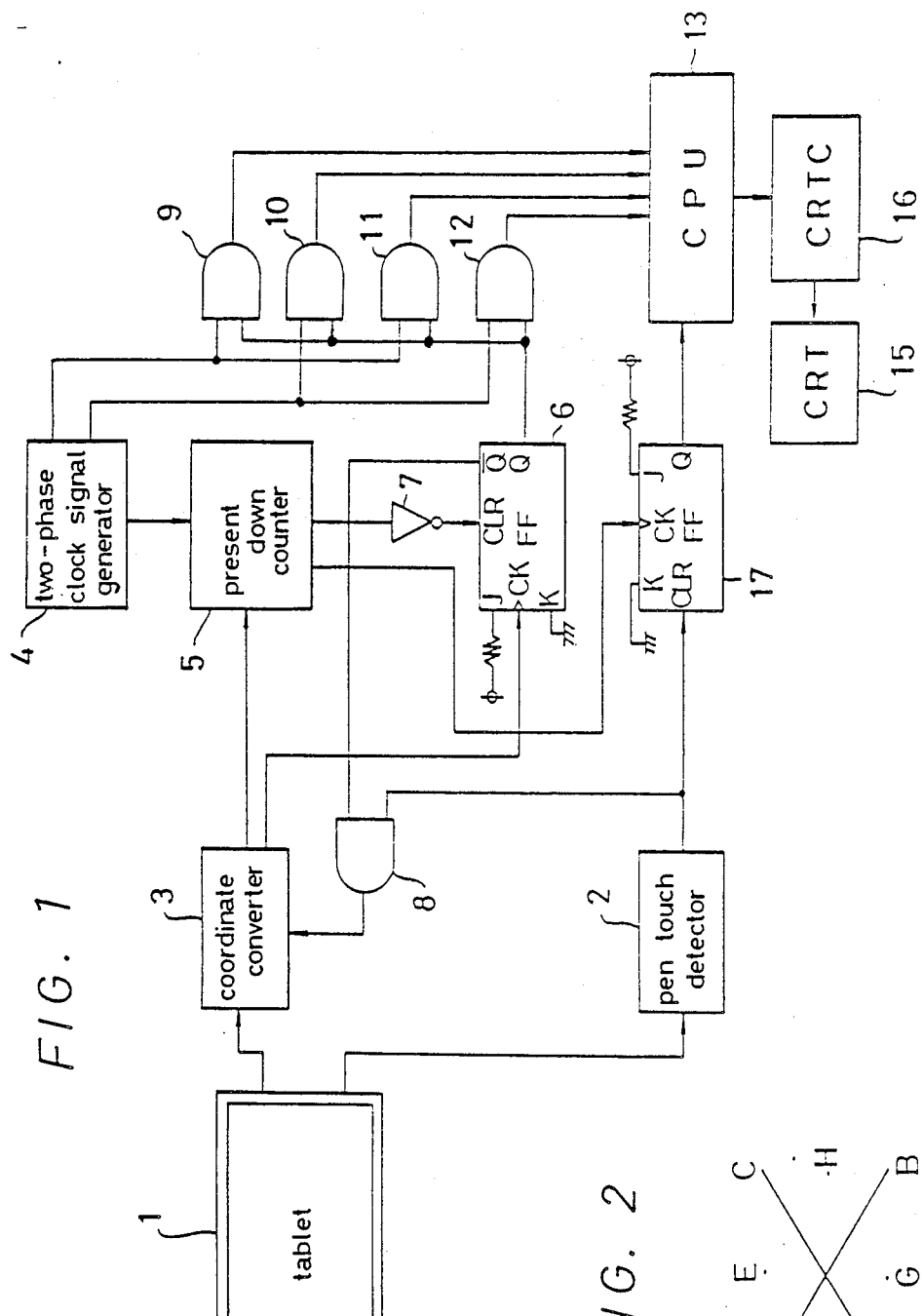
FIG. 1 is a block diagram representing one embodiment of the invention.
Figure 4:
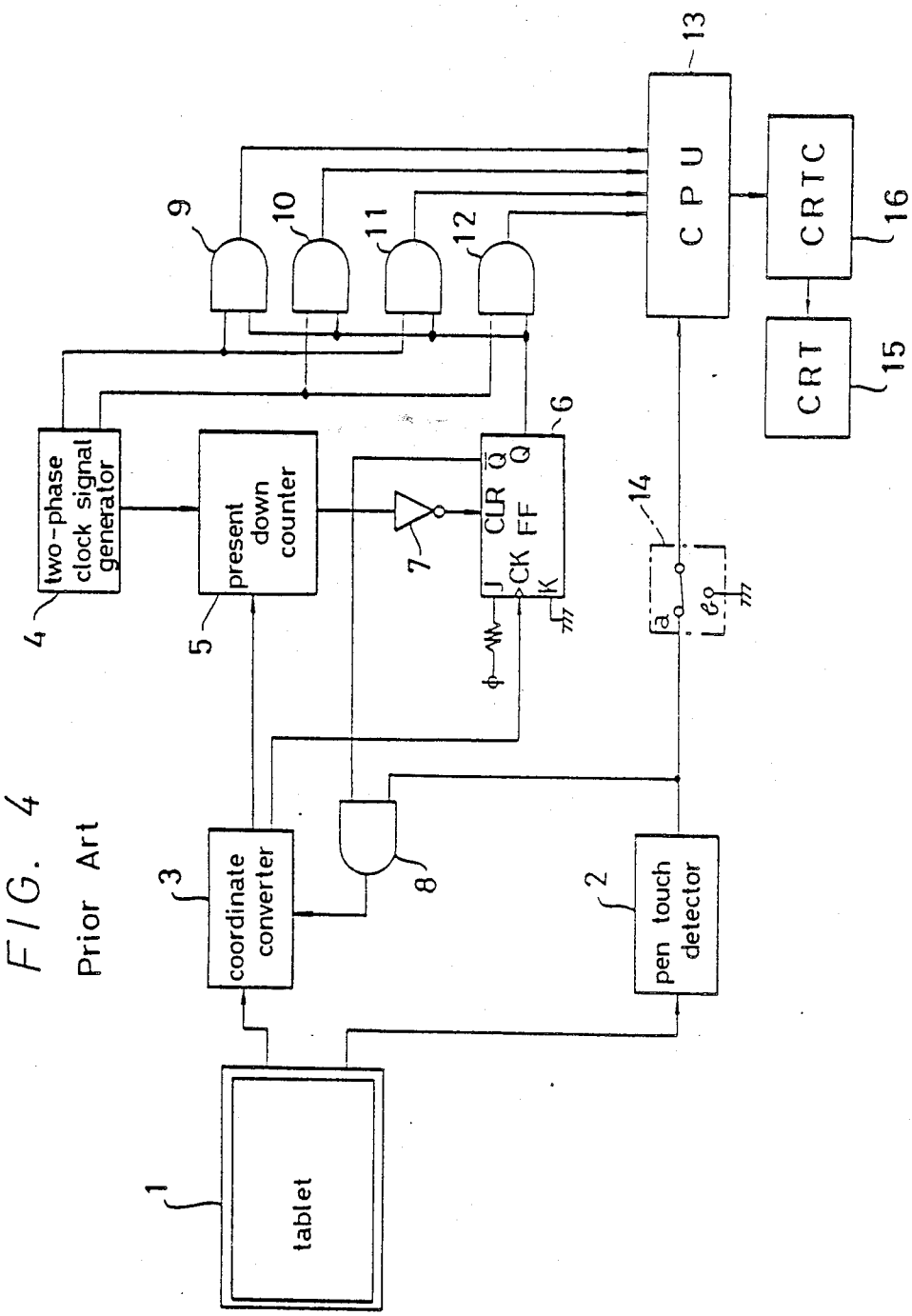
FIG. 4 is a view showing one example of a prior art pattern input unit.

FIG. 1 represents one preferred embodiment of the invention. In the drawing, reference numerals 1 to 13, 15, 16 represent like parts of FIG. 4. A reference numeral 17 denotes J-K FF, wherein a terminal J is connected to a direct current supply through a resistance, a terminal K is connected to a ground, an output signal from the counter 5 is inputted to a terminal CK when a count of the counter 5 reads "1", and an output signal from the pen touch detector 2 is inputted to a terminal CLR. Then, an output signal from a terminal Q is generated to CPU 13.

A decision means for deciding whether or not two points formed according to the two absolute coordinates generated from the tablet 1 are connected is constituted of the pen touch detector 2, CPU 13 and FF 17.

Figure 2:
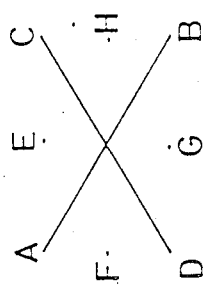
FIG. 2 is a view exemplifying a pattern to input.
Figure 3:
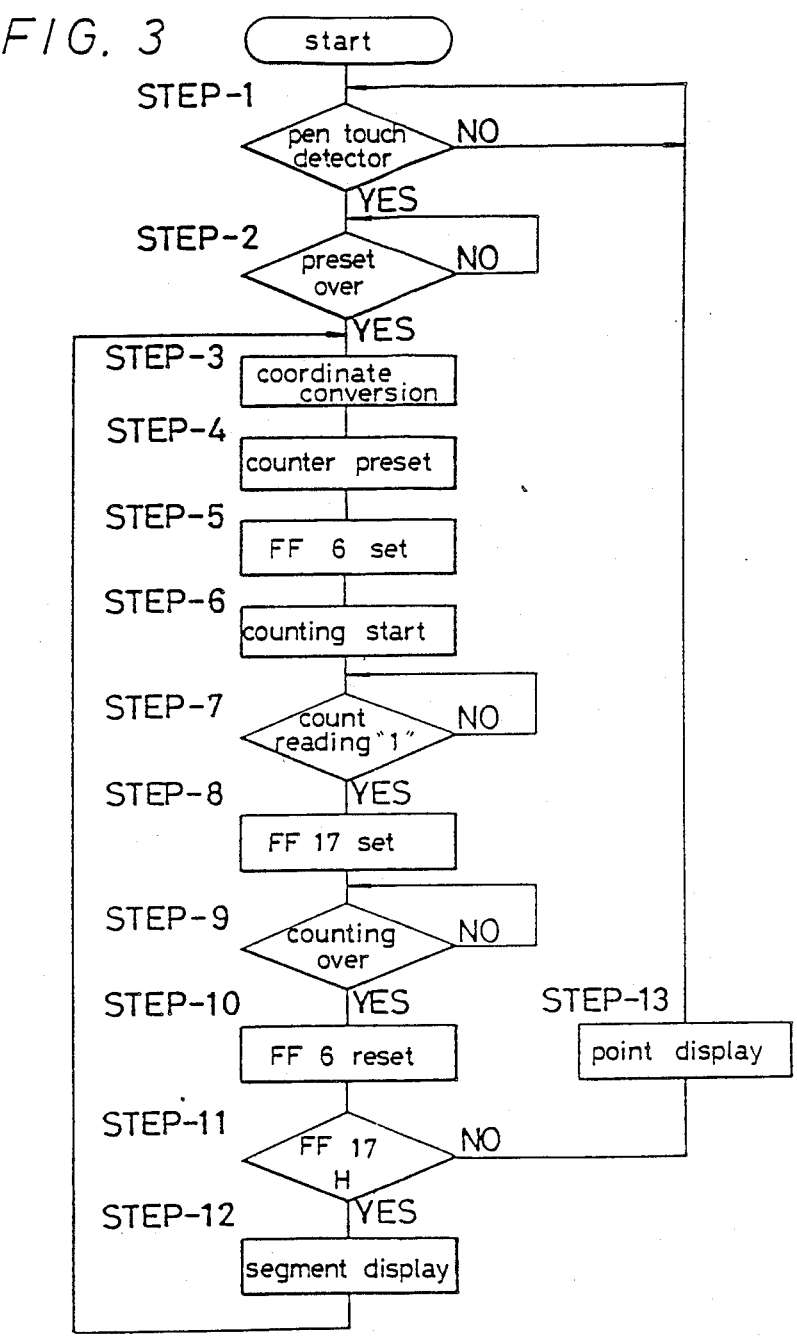
FIG. 3 is a performance flowchart.

Next, an operation for inputting the pattern shown in FIG. 2 will be described according to the flowchart of FIG. 3.

(1) First, a pen (not indicated) is touched to an origin on the tablet 1. Then, the pen touch detector 2 detects (STEP-1) that the pen has been touched to the tablet 1, and an output signal level of the pen touch detector 2 becomes H. Accordingly, a level of one input terminal of AND gate 8 becomes H. In this case, an output signal level of the counter 5 is L, the signal level is then inverted to H by the inverter 7, and inputted to another input terminal of AND gate 8, therefore an output signal level of AND gate 8, namely an input signal inputted to the coordinate coverter 3 shifts from L to H.

Next, when the pen touched to the origin is detached from the tablet 1, the output signal level of the pen touch detector 2 shifts from H to L. Thus, a level of the terminal CLR of FF 17 becomes L, and FF 17 is cleared. Accordingly, a level of the terminal Q of FF 17 becomes L.

Then, when the pen is retouched to the tablet 1 at the point A after detaching at the origin, the output signal level of the pen touch detector 2 shifts from L to H. Accordingly, the output signal level of AND gate 8, namely the input signal level inputted to the coordinate converter 3 shifts from L to H. Then, it is converted (STEP-3) into a relative coordinate (equal to an absolute coordinate in this case) of the point A to the origin by the coordinate converter 3 according to a coordinate data of the origin and an absolute coordinate data of the point A, and the relative coordinate is preset on the counter 5. Then, when the relative coordinate is preset on the counter 5, a preset end signal which is a single pulse of high level is inputted concurrently to the terminal CK of FF 6, and a level of the terminal Q of FF 6 shifts from L to H (STEP-5). Accordingly, a level of one input terminal of AND gates 9 to 12 becomes H.

Further, when the relative coordinate is preset on the counter 5, a counting of the clock signal from the two-phase clock signal generator is commenced by the counter 5 (STEP-6), and the clock signal from the two-phase clock signal generator 4 is inputted concurrently to CPU 13 through AND gates 9 to 12.

Then, when a count of the counter 5 reads "1" (STEP-7), an H single pulse is generated from the counter 5 and inputted to the terminal CK of FF 17. A level of the terminal Q of FF 17 then shifts from L to H, and FF 17 is set (STEP-8). Accordingly, an input terminal level of CPU 13 becomes H.

Next, when the count reads "0", or counting of the clock signal is over (STEP-9), the H single pulse is generated from the counter 5, and after having the level inverted by the inverter 7, it is inputted to the terminal CLR of FF 6 and one input terminal of AND gate 8. Then, FF 6 is cleared (STEP-10), and a level of the terminal Q of FF 6 becomes L. Further, an L single pulse is inputted to the coordinate converter 3 from the output terminal of AND gate 8, and the coordinate converter 3 is returned to the state of converting operation.

In this case, the point A is displayed by CRTC 16 at a position on CRT 15 decided according to the clock signal inputted to CPU 13 by the time when counting by the counter 5 is over.

(2) Operation for forming segment AB continuously:

When the pen is moved continuously from the point A toward the point B as touched to the tablet 1, the output signal level of the pen touch detector 2 remains H and the output terminal level of the counter 5 also remains H, therefore the output terminal level of AND gate 8 is H. Accordingly, a conversion from the absolute coordinate to the relative coordinate is carried out again by the coordinate converter 3, operations STEP-3 to STEP-10 are performed, the conversion into relative coordinate and operations STEP-3 to STEP-10 are repeated thereafter, and thus the segment on CRT 15 elongates after a move of the pen. Then, from stopping the pen moving at the point B and detaching it from the tablet 1, the segment AB is formed on CRT 15.

(3) Operation for forming segment CD continuously:

The operation for stopping the pen moving at the point B, detaching from the tablet 1 and then retouching it to the tablet 1 at the point C is similar essentially to the operation in the case of (1) where the pen touched at the origin is detached from the tablet 1 and then retouched to the tablet 1 at the point A.

From touching the pen at the point C on the tablet 1, first the point C is displayed on CRT 15, and from moving the pen as touched on the tablet 1, a segment gets long on CRT 15 after the move. Then, from stopping the pen moving at the point C and detaching it from the tablet 1, the segment CD is formed on CRT 15.

(4) Operation for forming point E continuously:

The operation for retouching the pen detached from the tablet 1 at the point D to the tablet 1 at a point E is similar essentially to the operation in the case of (1) where the pen touched to the origin is detached from the origin and then retouched to the tablet 1 at the point A, therefore a repeated description will be omitted here.

From detaching the pen from the tablet 1 without moving it after touching to the tablet 1 at the point E, an output signal level of the pen touch detector 2 shifts from H to L. In this case, since a level of the terminal CLR of FF 17 is L and a level of the terminal Q of FF 17 is L accordingly (STEP-11), the input terminal level of CPU 13 becomes L.

Consequently, the point E is displayed (STEP-13) by CRTC 16 at a position on CRT 15 decided according to the clock signal inputted to CPU 13 by the time when counting by the counter 5 is over.

(5) Operation for forming points F, G, H continuously:

Since the operation is similar essentially to that of (4) above, a repeated description will be omitted.

Thus, patterns can be inputted as in the case of actual handwriting.

What is claimed is:

1. A pattern input device comprising
a tablet and a pen,
means for detecting contact between said pen and said tablet and for generating a pen touch output signal representative thereof,
means electrically connected to said tablet for generating a coordinate signal representative of the position of contact between said pen and said tablet, said coordinate signal generating means comprising a down counter which, upon contact between said pen and said tablet, counts down from a value representative of the position of contact between said pen and said tablet to zero, said down counter generating a first down count signal when the count equals one and a second down count signal when the count equals zero,
a central processing unit,
a clock having an output clock signal,
means for electrically connecting the clock signal to said down counter so that said down counter counts down in unison with the clock signal,
means for electrically connecting the clock signal as an input signal to said central processing unit during down counting of said down counter and means responsive to said second down count signal for disconnecting said clock signal from said central processing unit,
a cathode ray tube display electrically connected to said central processing unit for displaying contact and movement of said pen on said tablet, and
means for providing an input signal to said central processing unit representative of continuous movement of said pen on said tablet, said last mentioned means comprising a flip flop having an output connected to said central processing unit, said flip flop having a clear input connected to receive said pen touch output signal and a clock input connected to receive said first down count signal so that, when said pen is moved out of contact from said tablet, said first down count signal sets the output from said flip flop to a first state while said first down count signal sets the output from said flip flop to a second state when the pen contacts said tablet.

* * * * *